No. 826,940. PATENTED JULY 24, 1906.
W. E. INGRAM.
DRIVING AND STEERING MECHANISM FOR MOTOR VEHICLES.
APPLICATION FILED JAN. 18, 1906.
2 SHEETS—SHEET 1.
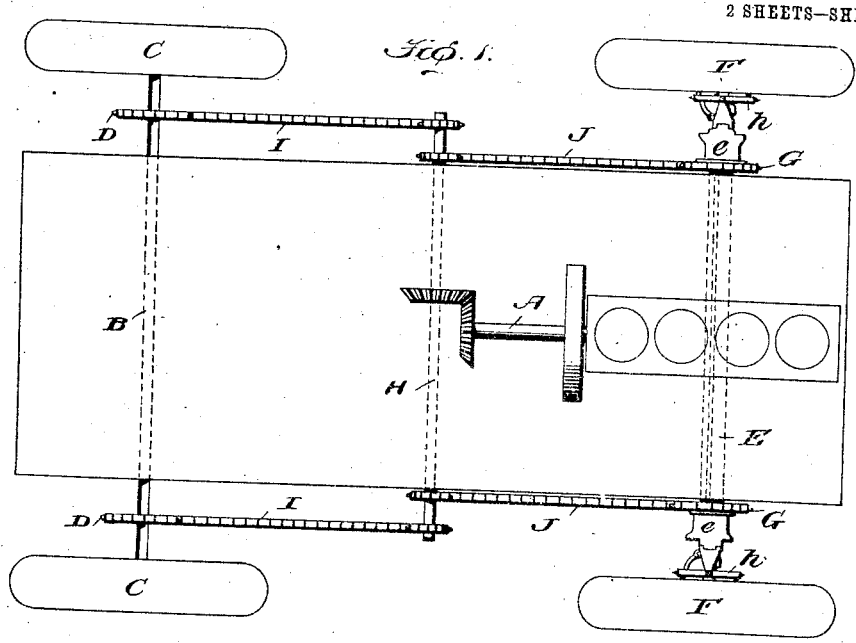
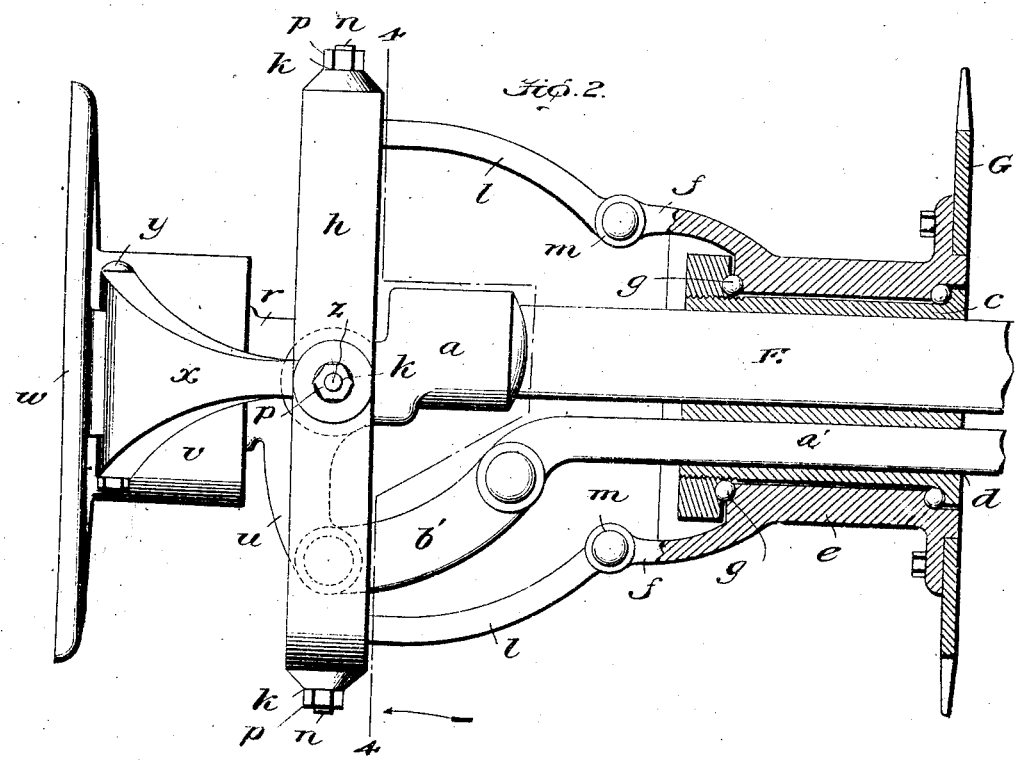
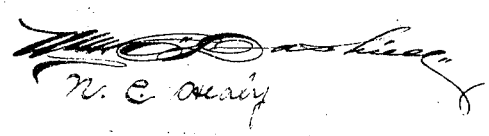
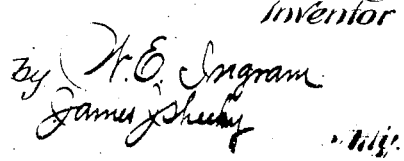

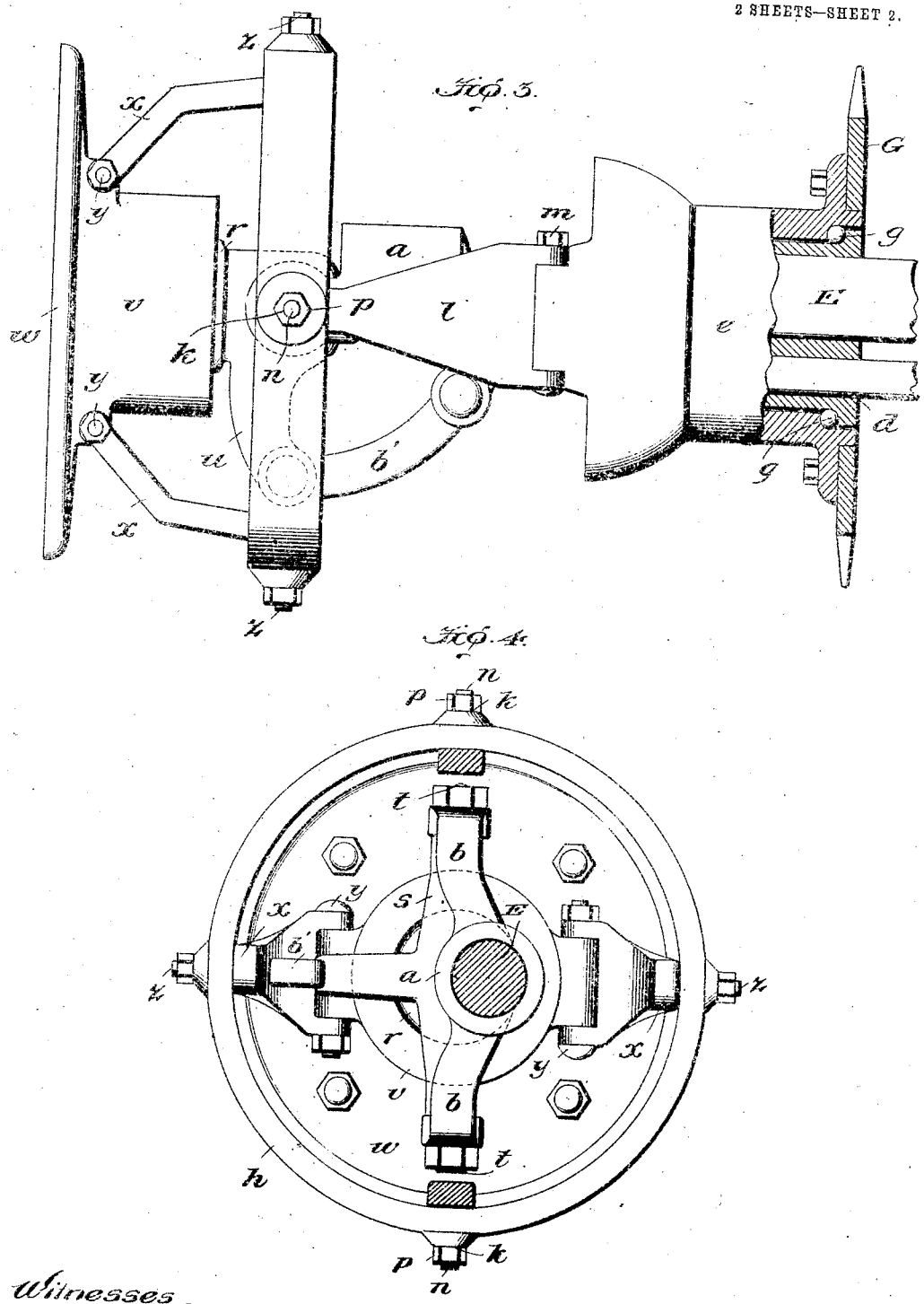

UNITED STATES PATENT OFFICE.

WESLEY E. INGRAM, OF STOCKTON, CALIFORNIA, ASSIGNOR OF ONE-THIRD TO F. R. CLARKE, OF STOCKTON, CALIFORNIA.

DRIVING AND STEERING MECHANISM FOR MOTOR-VEHICLES.

No. 826,940.

Specification of Letters Patent.

Patented July 24, 1906.

Application filed January 18, 1906. Serial No. 296,625.

*To all whom it may concern:*

Be it known that I, WESLEY E. INGRAM, a citizen of the United States, residing at Stockton, in the county of San Joaquin and State of California, have invented new and useful Improvements in Driving and Steering Mechanism for Motor-Vehicles, of which the following is a specification.

My invention pertains to motor-vehicles, and more particularly to driving and steering mechanism therefor; and it contemplates the provision of a simple and practical construction through the medium of which the front wheels of a motor-vehicle may be rotated to propel the vehicle without interfering with the said front wheels being swung in the manner necessary to guide the vehicle.

With the foregoing in mind the invention will be fully understood from the following description and claims, when taken in connection with the accompanying drawings, forming part of this specification, in which—

Figure 1 is a plan view of so much of a motor-vehicle as is necessary to illustrate the preferred application of my invention. Fig. 2 is an enlarged view, partly in elevation and partly in section, illustrative of the driving and steering mechanism of one of the front wheels. Fig. 3 is a view similar to Fig. 2, but showing the parts in different positions; and Fig. 4 is a section taken on the line 4 4 of Fig. 2 looking in the direction indicated by arrow.

Similar letters designate corresponding parts in all of the views of the drawings, referring to which—

A is the drive-shaft of a motor-vehicle.

B is the rear axle of the vehicle, which bears traveling wheels C and sprocket-wheels D.

E is the body of the front axle, which body is connected to the vehicle-frame in the ordinary manner or any other manner compatible with the purpose of my invention.

F F are the front wheels; G G sprocket-wheels connected with the said front wheels F in the manner hereinafter pointed out in detail.

H is a counter-shaft connected by intermeshed gears with the drive-shaft A.

I I are sprocket-belts connecting sprocket-wheels on the shaft H with the sprocket-wheels D on the shaft B, and J J are sprocket-belts connecting other sprocket-wheels on the shaft H with the sprocket-wheels G, complementary to the front wheels F. By virtue of this construction it will be apparent that driving connections are afforded between the drive-shaft of the motor and the front wheels F, as well as between the said motor-shaft and the rear wheels C, with the result that the capacity of the machine is increased.

The scheme of my invention is to transmit rotary motion to the front wheels F in such manner as not to interfere with said wheels being swung laterally to guide the vehicle, and to this end I provide in connection with each of the front wheels mechanism such as is plainly shown in Figs. 2 to 4. The said mechanism comprises a head $a$, formed integral with or suitably fixed on the end of the axle-body E and having oppositely-extending arms $b$, a sleeve $c$, arranged on the axle-body E and having a longitudinal bore or passage $d$, a hub $e$, fixed to one sprocket-wheel G and mounted to turn on the sleeve $c$ and having diametrically opposite outwardly-extending arms $f$, antifriction-balls $g$, disposed between the sleeve $c$ and the hub $e$ and arranged to move in races formed therein, a ring $h$, having four equidistant radially-disposed apertures $k$, swinging links $l$, pivoted at $m$ to the arms $f$ of hub $e$ and having lateral projections $n$ at their outer ends, disposed in apertures $k$ of the ring $h$ and secured by nuts $p$ or other suitable means; a spindle $r$, having a T-head $s$ at its inner end, pivoted at $t\ t$ to the arms $b$ on the axle-body, and also having an arm $u$, a hub $v$, mounted to rotate on the spindle $r$ and fixed, through the medium of the flange $w$ or other suitable means, to one front wheel F, links $x$, pivoted at $y$ to the hub $v$ and having projections $z$ disposed in the two other apertures $k$ of ring $h$, a rod $a'$, movable endwise through the passage $d$, provided in the sleeve $c$, and a link $b'$ interposed between and connecting the said rod $a'$ and the arm $u$ of the spindle $r$.

The rod $a'$ is designed to extend transversely of the vehicle and be connected with the spindle-arms $u$ of the two front wheels F, and it is also designed to be connected by suitable means, which I have deemed it unnecessary to illustrate, with the hand-wheel or other hand device for steering the vehicle, so that when said hand-wheel or other device is actuated the rod $a'$ will be moved endwise and the wheels F swung synchronously in one direction or the other. By virtue of the points of flexure afforded between the links $l$, the hubs $e$, and the rings $h$ of the two wheels F and the points of flexure provided between the links $x$ and the hubs of the wheels F and the rings $h$ it will be apparent that rotary motion will be transmitted from the sprocket-wheels G to the wheels F, and yet the mechanism for transmitting such rotary motion will not interfere with the operation of the rod $a'$, the links $b'$, and the spindles $r$ to swing the wheels F toward the right or the left and steer the vehicle. It will also be apparent that my novel driving and steering mechanism is simple and compact and is well adapted to withstand the shocks and strains to which such mechanisms are ordinarily subjected.

The swinging of each wheel F is effected through the medium of the rod $a'$, the link $b'$, and the spindle $r$, pivoted to the arms $b$, carried by the axle-body E, while rotary motion is transmitted to each wheel F from its complementary sprocket-wheel G through the medium of the hub $e$, which turns on the sleeve $c$, and with the sprocket-wheel G, the ring $h$, which turns with the hub $e$ and the wheel G, and yet is adapted to accommodate itself to the position of the wheel F relative to the sprocket-wheel G, and the links $x$, which connect the ring $h$ and the wheel-hub $v$, and yet permit the wheel to swing laterally with respect to the ring. It will be noticed that because of the rod $a'$ being carried through the sleeve $c$ the construction is rendered very compact, and at the same time the said rod $a'$ is reinforced and strengthened and the liability of it being broken, bent, or otherwise impaired in practice is reduced to a minimum.

Notwithstanding the practical advantages which I have hereinbefore ascribed to my novel mechanism it will be readily seen that the said mechanism does not greatly increase the cost of a motor-vehicle and does not detract in any way from the finished appearance thereof.

I claim—

1. In a driving and steering mechanism for motor-vehicles, the combination of an axle-body, a spindle mounted to swing on said body, a wheel rotatable about the spindle, a sleeve mounted on the axle-body and having a longitudinal bore or passage, an endwise-movable rod disposed in the bore or passage of the sleeve and connected with the spindle, a hub arranged on and rotatable about the sleeve, a gear-wheel fixed with respect to said hub, and connections intermediate the said hub and the wheel on the spindle for transmitting rotary motion from the former to the latter; the said connections being arranged to accommodate themselves to swinging movements of the wheel.

2. In a driving and steering mehanism for motor-vehicles, the combination of an axle-body, a head carried at one end of said body, a spindle pivoted to said head and arranged to swing in a horizontal plane, a wheel carried by and rotatable about the spindle, a sleeve mounted on the axle-body and having a longitudinal bore or passage, an endwise-movable rod disposed in the bore or passage of the sleeve, a link interposed between and connecting the said rod and an arm on the spindle, a hub arranged on and rotatable about the sleeve, antifriction devices interposed between the sleeve and the hub, a gear-wheel fixed with respect to said hub, and connections intermediate the hub and the wheel on the spindle for transmitting rotary motion from the former to the latter; the said connections being arranged to accommodate themselves to swinging movements of the wheel.

3. The combination in a driving and steering mechanism for motor-vehicles, of an axle-body, a spindle mounted to swing on said body, a wheel rotatable about the spindle, a sleeve mounted on the axle-body and having a longitudinal bore or passage, an endwise-movable rod disposed in the bore or passage of the sleeve and connected with the spindle, a hub arranged on and rotatable about the sleeve, a gear-wheel fixed with respect to said hub, a ring surrounding the connection between the spindle and the axle-body, links pivoted to and connecting the hub on the sleeve and the said ring, and links pivoted to and connecting the wheel and the said ring.

4. In a driving and steering mechanism for motor-vehicles, the combination of an axle-body, a head carried at one end of said body, a spindle pivoted to said head so as to swing in a horizontal plane and having an arm, a wheel carried by and rotatable about the spindle, a sleeve mounted on the axle-body and having a longitudinal bore or passage, an endwise-movable rod disposed in said bore or passage, a link connecting said rod and the arm of the spindle, a hub arranged on and rotatable about the sleeve and having a gear-wheel fixed with respect to it, antifriction devices arranged between the sleeve and the hub, a ring surrounding the connection between the axle-body and the spindle and having equidistant radial apertures, diametrically opposite links pivoted to the hub on the sleeve and having projections disposed in two of the apertures of the ring, and diametrically opposite links pivoted to the wheel and having projections disposed in the other two apertures of the ring.

5. In a driving and steering mechanism for motor-vehicles, the combination of an axle-body, a spindle mounted to swing on said body, a wheel rotatable about the spindle, suitable means for transmitting swinging motion to the spindle, a gear rotatable about the axle-body, and a connection intermediate said gear and the wheel comprising a ring surrounding the connection between the spindle and the axle-body and having four equidistant radial apertures, diametrically opposite links pivotally connected with the gear and having projections disposed at right angles to said pivotal connections and arranged in two of the apertures of the ring, and diametrically opposite links pivotally connected with the wheel and having projections disposed at right angles to said pivotal connections and arranged in the other two apertures of the ring.

6. The combination in a driving and steering mechanism for motor-vehicles, of an axle-body, an endwise-movable rod guided on said axle-body, a spindle mounted to swing on the axle-body, a connection between the rod and the spindle, a wheel rotatable about the spindle, a gear rotatable about the axle-body, and means connecting the said gear and the wheel to transmit rotary motion from the former to the latter and arranged to accommodate itself to the swinging movements of the spindle and wheel.

7. The combination in a driving and steering mechanism for motor-vehicles, of an axle-body, an endwise-movable rod, a spindle mounted to swing on the axle-body, a connection between the rod and spindle, a wheel rotatable about the spindle, a sleeve surrounding the axle-body and having a bore or passage receiving and adapted to guide the endwise-movable rod, a gear rotatable about the said sleeve, and means connecting the said gear and the wheel to transmit rotary motion from the former to the latter and arranged to accommodate itself to the swinging movements of the spindle and wheel.

In testimony whereof I have hereunto set my hand in presence of two subscribing witnesses.

WESLEY E. INGRAM.

Witnesses:
J. H. INGRAM,
ALFRED R. NEEDLES.